United States Patent [19]
Gouda et al.

[11] Patent Number: 5,422,442
[45] Date of Patent: Jun. 6, 1995

[54] MECHANISM FOR CONTAINING INPUT PEN

[75] Inventors: Norifumi Gouda, Nara; Syunichi Miyako; Takeshi Sawada, both of Yamatokoriyama, all of Japan

[73] Assignee: Sharp Kabushiki Kaisha, Osaka, Japan

[21] Appl. No.: 140,829

[22] Filed: Oct. 25, 1993

[30] Foreign Application Priority Data

Oct. 30, 1992 [JP] Japan .................................. 4-293286

[51] Int. Cl.⁶ ..................... G08C 21/00; B65D 6/04; A47F 7/00
[52] U.S. Cl. ............................. 178/18; 206/564; 211/69.1
[58] Field of Search .................... 178/18, 19; 206/371, 206/564; 211/69.1; 345/179

[56] References Cited

U.S. PATENT DOCUMENTS

| | | | |
|---|---|---|---|
| 4,927,986 | 5/1990 | Daly | 178/18 |
| 4,988,836 | 1/1991 | Murray | 178/18 |
| 5,180,891 | 1/1993 | Trumbo | 178/18 |

FOREIGN PATENT DOCUMENTS 2-145437 12/1990 Japan .

Primary Examiner—Stephen Chin
Assistant Examiner—Kevin Kim
Attorney, Agent, or Firm—Nixon & Vanderhye

[57] ABSTRACT

The mechanism for containing an input pen is provided with a pen holder having a shape of pipe, which contains an input pen having substantially a shape of stick, keeping the back end of the input pen exposed. The pen holder is provided with a pen stopper to couple with the input pen. There is provided a locking groove which is coupled with the pen stopper. There is provided a plate spring which supplies force to the pen stopper to the inside of the pen holder. At least one of the pen stopper and the locking groove is so shaped that the pen stopper is supplied force against the force of the plate spring when the input pen is supplied force in the discharge direction. In this arrangement, the mechanism for containing an input pen can be made simpler since the input pen can be taken out without a releasing button conventionally needed. Therefore, since the number of parts and the number of manufacturing procedures in assembly decrease, manufacturing cost can be reduced.

26 Claims, 15 Drawing Sheets

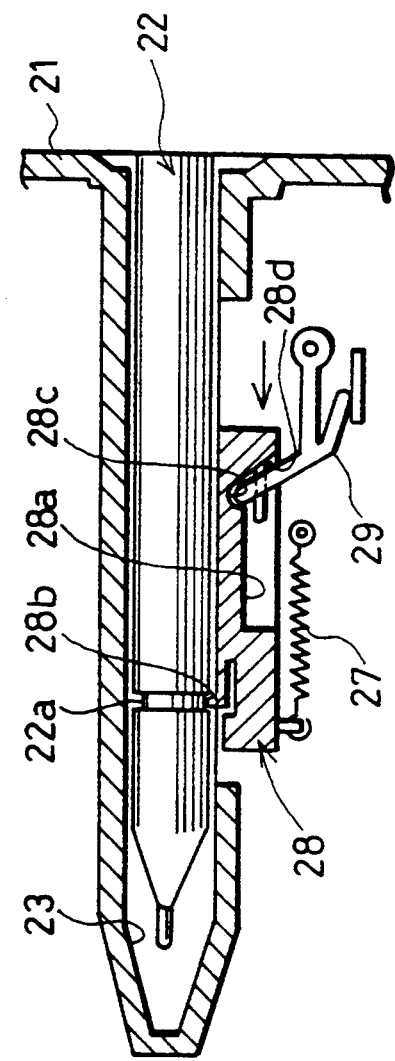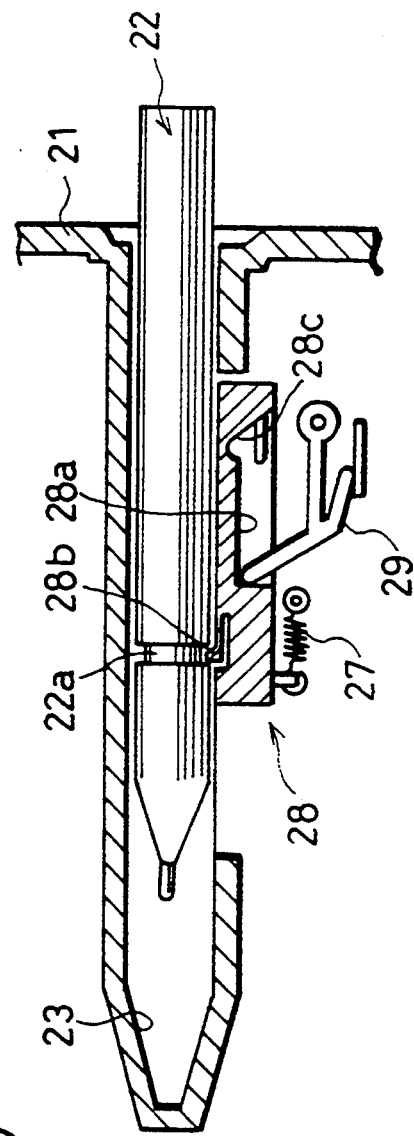
FIG.22(a)
FIG.22(b)

5,422,442

MECHANISM FOR CONTAINING INPUT PEN

FIELD OF THE INVENTION

The present invention relates to a mechanism for containing an input pen for inputting information by handwriting on a display device installed in a personal computer and a handy electronic device.

BACKGROUND OF THE INVENTION

A conventional mechanism for containing an input pen is shown in FIG. 15 for example. A main body 21 is provided with a pen container 23. The pen container 23 fits to the top of an input pen 22 so as to hold. However, in this mechanism, when the input pen 22 is taken out, it is required to move backward the input pen 22 which is in the main body 21 and afterwards to take it out of the pen container 23. Therefore, it presents a problem that it takes long to put in and take out the input pen 22.

Therefore, another mechanism is devised as shown in FIG. 16. It has a pen holder 24, one end of which is fixed in the main body 21 and another end of which can pivot around the fixed end for the main body 2 1, fitting to the top end of the input pen 22 so as to be contained and removed. In the mechanism, the input pen 22 can be easily contained and removed by the pen holder 24 rotating when the input pen 22 is removed as shown in FIG. 17.

In a case where the mechanism has a cover 25 for covering over the main body 21 as shown in FIG. 18(a), a pen container 23 is provided on the main body 21. Is shown in FIG. 18(b), when the cover 25 opens, one end of the input pen 22 rotates upward around another end of the input pen 22.

In this mechanism, the cover 25 can hold the input pen 22 by covering an opening of the pen container 23 when the cover 25 shuts. Moreover, when it opens, the input pen 22 easy to be taken out.

However, in such above described mechanisms, a vibration during carrying or the like causes the input pen 22 to rock easily in the main body 21. Therefore, bothering noises such as one by knocking is generated. The rocking also results in that the main body 21 and the input pen 22 tends to be damaged.

In order to meet the deficiency, for example, another mechanism described in the Japanese unexamined utility model publication No. 2-145437(1990) is known. The mechanism has a pen container 23 in the main body 21 and has a locking mechanism 26 as shown in FIGS. 19 to 21. The pen container 23 contains the whole body of the input pen 22 when it is inserted. The locking mechanism 26 locks the inserted input pen 22.

The input pen 22 is provided with a locking groove 22a in its outer periphery, and the locking mechanism 26 is provided with a coupling 26a for coupling with the locking groove 22a, so as to support elastically the coupling 26a. There is provided a releasing button 26b for operatively combining with the coupling 26a on the main body 21 in an exposed manner. There is provided a spring 27 which pushes the contained input pen 22 to a discharge direction.

With the arrangement, only if the input pen 22 is inserted into the pen container 23, the input pen 22 is locked. Therefore, the damage of the input pen 22 and the main body 21 by rocking can be prevented. Since a part of the input pen 22 comes out when the locking mechanism 26 releases locking, the input pen 22 is easy to be taken out when it needs to be used.

However, according to the structure, it is necessary to expose the releasing button 26b on the main body 21, thereby limiting how to design the outline of the main body 21 and arrange each part of a display. Therefore, there is a problem that it is limited to design a display and other devices of, for example, the handy electronic apparatuses.

Therefore, in order to avoid such the problem, for example, another mechanism as shown in FIG. 22 is devised, which can contain and take out the input pen 22 without the releasing button 26b.

In the mechanism, there is provided a locking device 28 for locking the contained input pen 22. A recess 28a is provided in a lower portion of the locking device 28, which extends in a moving direction of the locking device 28. A controlling member 29 is supplied a clockwise force, the top of which fits to the recess 28a so as to move.

In the mechanism, when the input pen 22 is contained in the pen container 23, a coupling nail 28b of the locking device 28 fits to the locking groove 22a of the input pen 22, and the locking device 28 moves in accordance with insertion of the input pen 22 as above described. Therefore, the top of the controlling member 29 couples with a coupling part 28c in the recess 28a.

In this way, though force is applied to the locking device 28 by a discharge spring 27 in the discharge direction of the input pen 22, the input pen 22 stays at the position of containing of the pen container 23 against the force of the discharge spring 27.

The following is an explanation about how to discharge the contained input pen 22. When the input pen 22 is pushed a little deeper in the direction of insertion by hand, the controlling member 29 rotates counterclockwise along a slope 28d which is at the back end of the recess 28a with respect to the insert direction. Therefore, the coupling part 28c gets free from the controlling member 29.

When the input pen 22 ceases to be pushed then, by the force of the discharging spring 27, the controlling member 29 moves in the recess 28a, that the locking device 28 moves in the discharge direction of the input pen 22 before the controlling member 29 couples with the coupling part 28c again. Therefore, the input pen 22 is discharged from the pen container 23. In this way, the input pen 22 is put in and taken out.

However, the required number of the parts increases because of complication of the mechanism according to the conventional structure, so manufacturing cost increases. To make the matter worse, it is also difficult to make the size of the mechanism small because space is necessary to contain the complicated mechanism in, thereby causing the mechanism to be bulky.

SUMMARY OF THE INVENTION

An object of the present invention is to provide mechanism to contain an input pen which can make its structure simpler, its size smaller, and its cost lower.

To achieve the above described object the mechanism for containing an input pen of the present invention has containing means and force supplying means. The containing means contains an input pen having a shape of substantially stick by coming into contact with a top end and back end of the pen respectively. The force supplying means supplies force to the input pen contained in the containing means so as to remove the input pen from the containing means.

Further, the containing means is so provided that the contained input pen can move axially and that whether the top end or the back end of the input pen can decouple with the containing means.

In this arrangement, the containing means is so made that the input pen can move axially, so, for example, an operator can push the input pen into the containing means against the force supplying means with the top end of the input pen in contact with the containing means.

When the input pert moves axially in the direction towards the back end in the containing means, the containing means is in contact with both the top end and the back end of the input pen. Therefore, the input pen can be contained in the containing means against the force. Thus, the input pen can keep the condition that both its top end and its back end are in contact with the containing means, so rocking of the input pen in the containing means can be prevented.

When removing the input pen, the input pen is moved axially. Then, one end, for example, the back end, decouples with the containing means. Then, the input pen moves to the position at which it can be removed by hand by the force of the force supplying means.

Since in this way the structure makes it possible that the input pen contained in the containing means moves axially so in it that whether the top end or the back end of the input pen decouples with the containing means, the input pen can be contained in and taken out from the containing means.

Since in the structure the input pen can be taken out without a releasing button conventionally needed, the size of the mechanism for containing an input pen can be made smaller by omitting space for such as the releasing button. Furthermore, since structure can be made simpler than conventional one which has a complicated part to lock a pen, the number of parts and the number of manufacturing procedures decrease. Therefore, manufacturing cost can be decreased.

To achieve the before described object, the other mechanism to contain an input pen of the present invention comprises: stick member at the top end of an input pen having a shape of substantially stick; force supplying means in the input pen; and a containing means which contains the input pen. The force supplying means supplies force to the stick member such direction as the stick member goes out of the input pen. The containing means pushes the stick member in the direction of axis of the input pen while it is in contact with the back end of the input pen. Moreover, when the containing means contains the input pen, the containing means makes it possible that the stick member moves in such a direction as to retreat in the input pen.

Since in the structure the stick member is so provided at the top end of the input pen as to move axially, the stick member can be inserted to the containing means and then the input pen can be pushed into the containing means against the force of the force supplying means.

Then the back end of the input pen gets contact with the containing means and the stick member gets contact with the containing means in the condition that the stick member is pushing the containing means. Therefore, the input pen can be contained in the containing means against the force. In this way, both the back end of the input pen and the stick member keep contact with the containing means by the above described force, so the input pen is prevented from rocking in the containing means.

When taking out the input pen, the input pen is moved axially so that the stick member retreats in the input pen. Then, the back end decouples with the containing means and the input pen can be taken out from the containing means.

Since in the structure the input pen contains the force supplying means which supplies force to the stick member, the input pen can be contained in and taken out from the containing means. Since in the structure the input pen can be taken out without releasing button conventionally needed, the size of the mechanism for containing an input pen can be made smaller by ommitting space for such as a releasing button.

Furthermore, since structure can be made simpler than conventional one which has a complicated part to lock a pen, the number of parts and the number of manufacturing procedures decrease. So manufacturing cost can be decreased.

Moreover, though it was necessary to push the input pen into the containing means first and pull the pen second at operating conventional mechanisms using parts to lock a pen, it is no necessary in this structure.

To achieve the before described object the other mechanism for containing an input pen of the present invention comprises: a containing part; a first coupling part; force supplying means; and a second coupling part. The containing part has a shape of pipe and contains the input pen in the condition that the back end of the input pen is exposed when it is contained and that the input pen can be movable axially. The first coupling part is projected and can move forwards and backwards for the containing part to couple with the inserted input pen. The force supplying means pushes the first coupling part towards the inside of the containing part. The second coupling part is on the perimeter of the input pen and has a depression to couple with the first coupling part of the input pen in the containing part, at least one of the coupling parts is so shaped that the first coupling part receives force against the force of the force supplying means when the contained input pen receives force in the direction to go out of the containing part.

In the structure, when the input pen is inserted to the containing part, the first coupling part gets contact with the second coupling part and the input pen is contained and coupled with in the containing part.

When taking out the input pen, it is required to have the back end of the input pen and supply force in the discharge direction because the back end of the contained input pen is exposed. Since at least one of the coupling parts is so shaped that the first coupling part receives force against force of the force supplying means then, the first coupling part, which can move forwards and backwards, moves against the force of the force supplying means when the force in the discharge direction becomes more than a predetermined value. Then, the first coupling part decouples with the second coupling part, so the input pen, which contained force in the discharge direction, can be taken out from the containing part.

Since in this structure the coupling parts are coupled with each other when the input pen is inserted, the input pen can be contained in the containing part without rocking.

Moreover, since in the structure at least one of the coupling parts are so shaped that the first coupling part receives force against force of the force supplying means, such releasing button as conventional mechanisms needed is not necessary at taking out the input pen from the containing part. Therefore, space for such releasing button can be omitted and structure can be made simpler than such conventional mechanism for locking as has a complicated structure. Therefore, size of the mechanism can be made smaller and manufacturing cost can be decreased in this structure.

Furthermore, it was necessary to push the input pen into the containing part first at taking out the input pen when an operator used a conventional mechanism with a part for locking, but such operation can be omitted in this structure.

Other objects, features, and merits of the present invention will be well understood by the following descriptions. Advantages of the present invention will reveal by the next explanations referring the additional figures.

BRIEF DESCRIPTION OF THE DRAWINGS

FIG. 18(a) is a perspective view and FIG. 18(b) is an enlarged fragmentary perspective view.

FIG. 22(a) and FIG. 22(b) another conventional mechanism for containing an input pen.

FIG. 22(a) is a cross sectional view when the input pen is contained and FIG. 22(b) is a cross sectional view when the input pen comes out to the position to be taken it out.

DESCRIPTION OF THE EMBODIMENTS

First embodiment

The following description explains with an example of the present invention with reference to FIGS. 1 to 5.

A mechanism for containing an input pen is, for example, adopted for electric devices with a display which is also used for a screen to input data through handwriting, such as laptop-type personal computers, notebook-type computers, and pocket-type computers.

Figure 2:
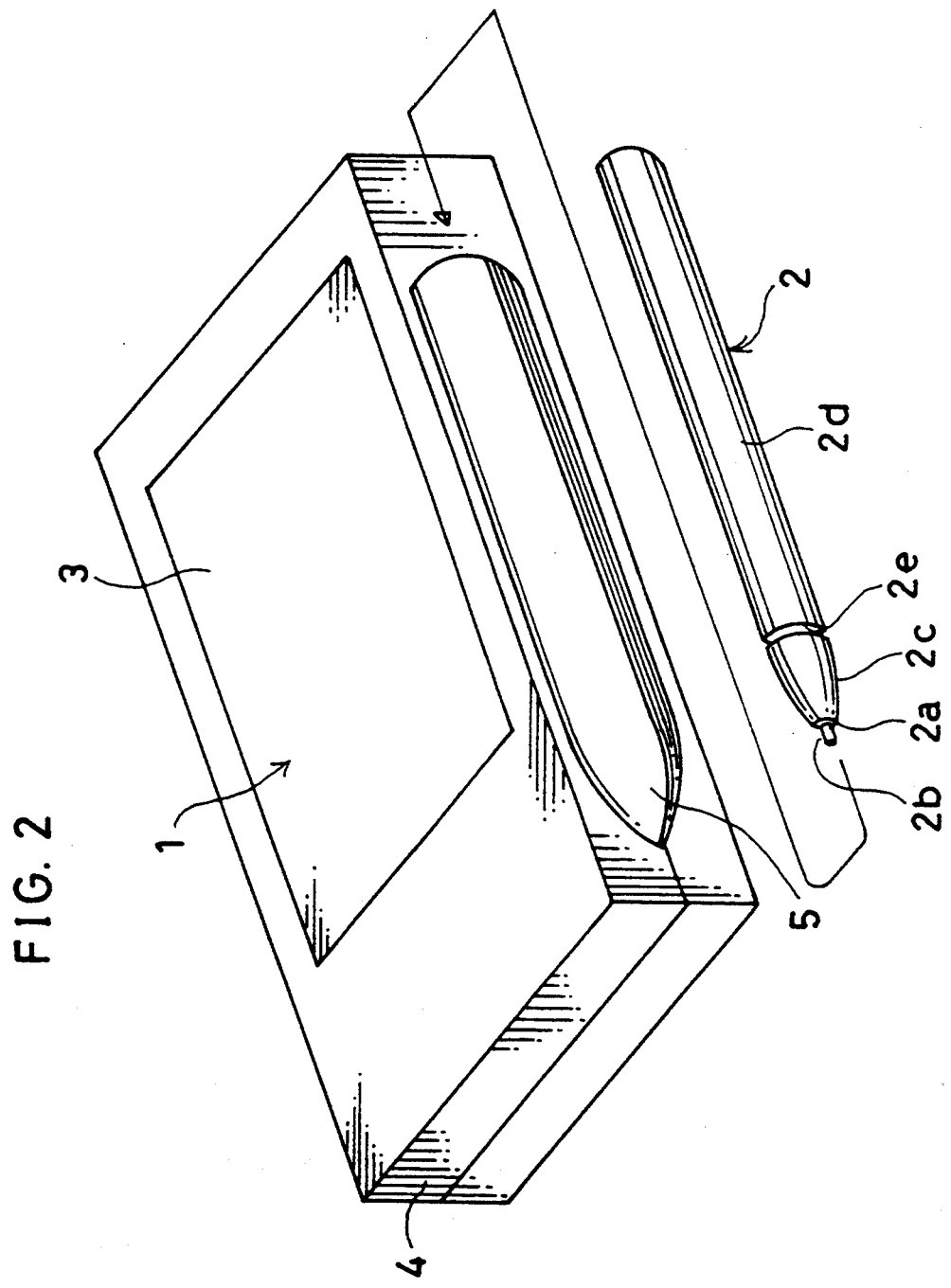
FIG. 2 shows a perspective view of the above described mechanism for containing input pen when it contains the input pen.
Figure 3:
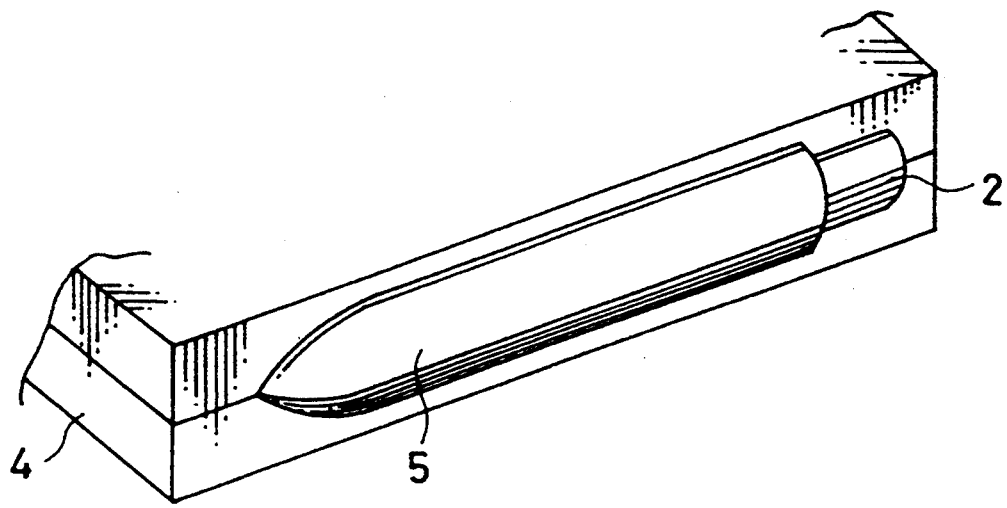
FIG. 3 shows a perspective view of the above described mechanism for containing an input pen when it has contained the input pen.

As shown in FIG. 2, there is provided a transparent tablet 3 on such a display screen (not shown) as a liquid-crystal display in a handwriting-use input screen 1 in the above described mechanism. The handwriting screen 1 exchanges figures drawn with an input pen 2 on the tablet 3 to electrical signals, that is, graphic data to coordinates data. Thus marks for controlling and editing can be inputted with handwriting.

Note that electric distortion type and magnetic type are used for the tablet 3 and that other types such as electrostatic coupling type, pressure sensitive type, supersonic type, and electromechanical types may be used.

A main body 4 of the mechanism is shaped substantially like a rectangular parallelopiped, having the handwriting screen 1 on its upper side, and a pen holder 5 (a containing part) on a side face of the main body 4 along the length thereof. The pen holder 5 has a shape of substantially pipe. The input pen 2 is shaped substantially like a stick, and the shape of cross section is substantially an ellipse. The input pen 2 is inserted from its top into the pen holder 5. The pen holder is so shaped as the tail of the input pen 2 is not wholly hidden when the input pen 2 is finished inserting into the pen holder 5 (See FIG. 3).

Figure 1:
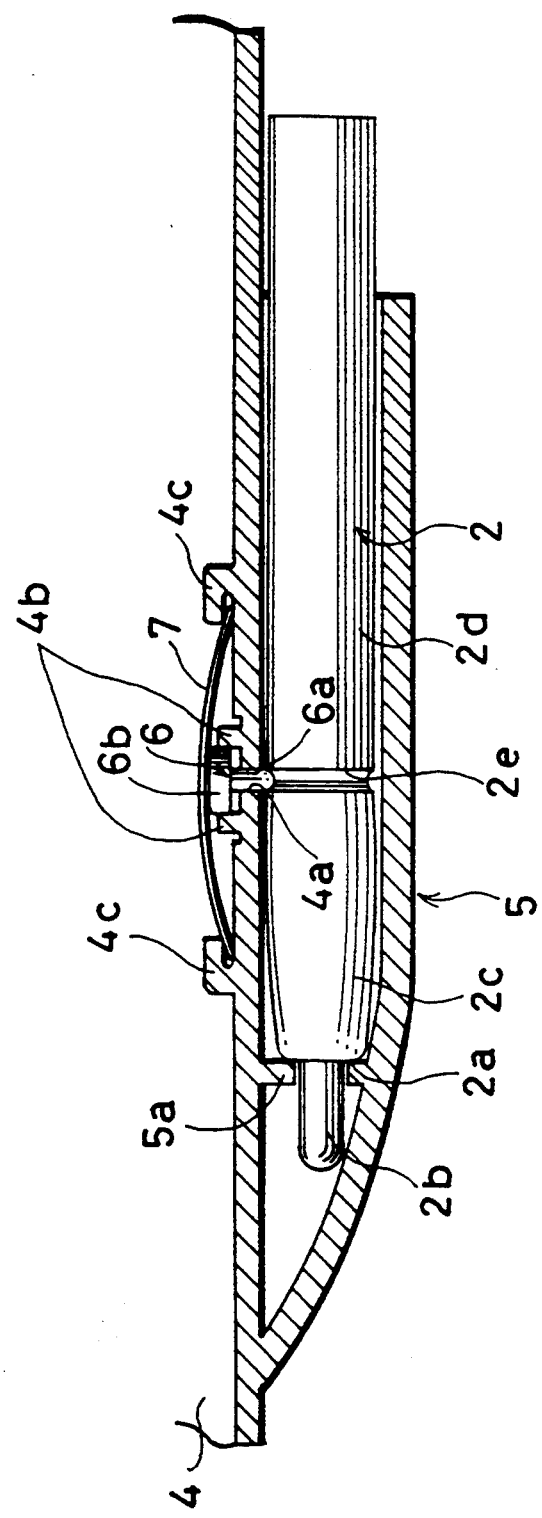
FIG. 1 shows a cross sectional view of a mechanism for containing an input pen of the first embodiment of the present invention.

There is provided a pen top 2b on a top surface 2a of the input pen 2 in order to detect the coordinate data on the tablet 3 as shown in FIGS. 1 and 2. The pen top 2b is shaped substantially like a stick and stands coaxially with the input pen 2. The pen 2 has a tapering part 2c at its top end, and a barrel part 2d at its back end. The radial sectional area of the tapering part 2c grows smaller as it is closer from side in contact with the top surface 2a to top of the pen 2. The radial sectional areas of the barrel part 2d are almost constant from one end to another.

There is provided a locking groove 2e (a second coupling part) in the outer periphery of the input pen 2 so as to locate near the boundary between the tapering part 2c and the barrel part 2d. Note that the sectional shape of the locking groove; 2e is not limited to a specific shape. All necessary about the shape of the groove 2e is that the locking groove 2e is shaped like a tapering and that its sectional areas along the axis of the input pen 2 grow larger as it is nearer from bottom of the locking groove 2e to outer surface of the input pen 2. For example, the sectional shape of the locking groove 2e may be substantially a trapezoid, and substantially an arc which is from a quarter to a half of a whole circle.

As shown in FIG. 1, there is provided a flange 5a towards the center of the pen holder 5, which comes into con tact with the top surface 2a and is penetrated by the pen top 2b when the input pen 2 is inserted into the pen holder 5. When the input pen 2 is inserted into the pen holder 5 till the top surface 2a comes into contact with the flange 5a, a pen stopper 6 (a first coupling part) couples the input pen 2 by coming into contact with the locking groove 2e.

Figure 4:
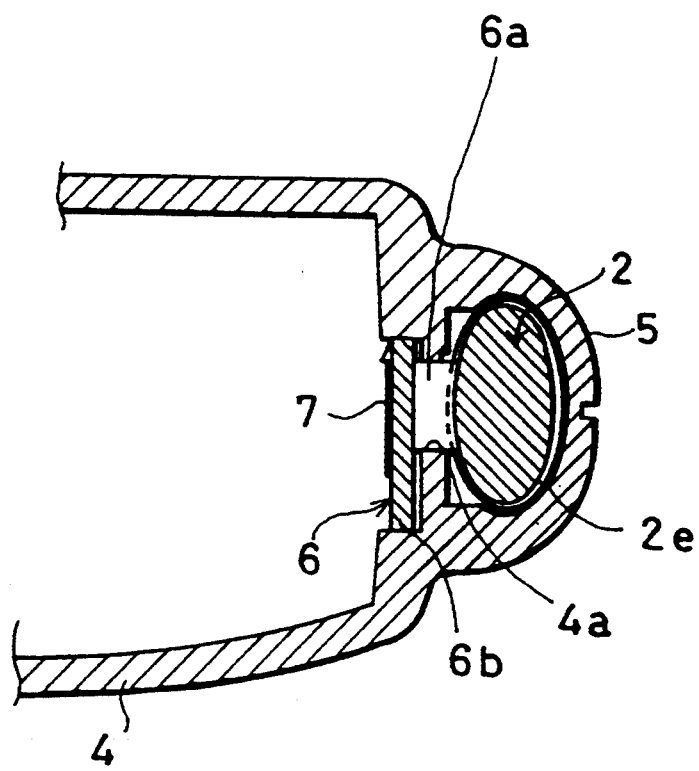
FIG. 4 shows a cross sectional view of the above described mechanism for containing an input pen.
Figure 5:
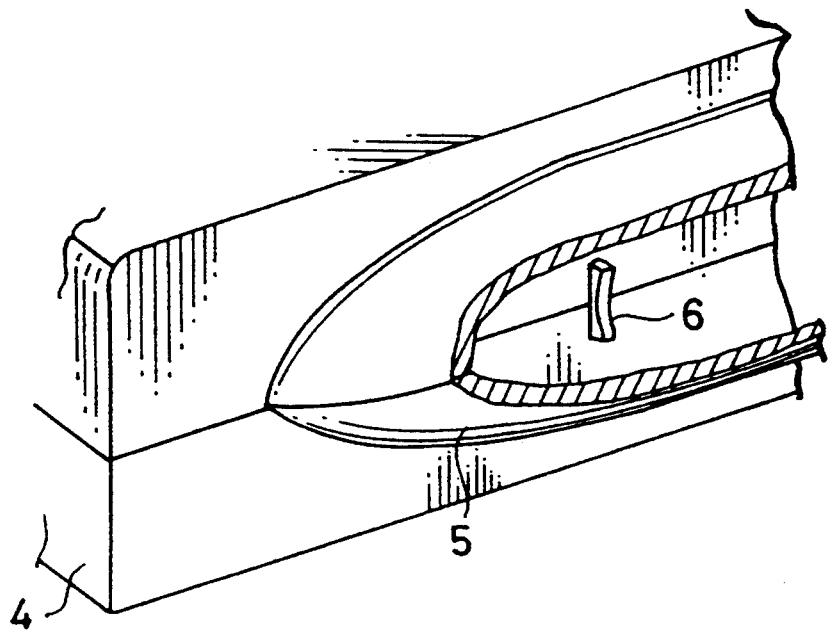
FIG. 5 shows a fragmentary perspective view of the above described mechanism for containing an input pen when it is cut partially.

The sectional shape of the pen stopper 6 is substantially like the character "T". There is provided a stopper 6a at the top of the pen stopper 6. Is shown in FIGS. 4 and 5, the top of the stopper 6a is so shaped as to fit to the locking groove 2e. There is provided a through hole 4a at the wall of the main body 4. The stopper 6a is in the through hole 4a and can move through it.

There is provided a head part 6b as a base of the pen stopper 6 and a pair of sustaining parts 4b on the inner side of the main body 4. The head part 6b is caught between the pair of sustaining parts 4b so as to move. Even when the head part 6b moves to touch the main body 4, a head part of the head part 6b is still over the pair of sustaining parts 4b. There is provided a pair of keeping parts 4c towards each other on the main body 4, and, in the main body 4, a plate spring 7 (force supplying means) is mounted on the pair of keeping parts 4c so that the plate spring 7 pushes the head part 6b out of the main body 4.

Since the shapes of the stopper 6a and the locking groove 2e are as above, when force is applied to the input pen 2 in the discharge direction, force occurs in the direction where the pen stopper 6 moves against the force of the plate spring 7.

As shown in FIG. 2, when the input pen 2 is inserted into the pen holder 5 from the pen top 2b, the input pen 2 goes into the pen holder 5 in accordance with the shape of the holder 5.

During the insertion, the pen stopper 6 is always pushed towards the outer side of the main body 4 from the inner side of the main body 4 by the plate spring 7, but when the input pen 2 is inserted, the pen stopper 6 moves to the inner side of the main body 4 through the through hole 4a against the force of the plate spring 7 with the top of the stopper 6a of the pen stopper 6 touching the tapering part 2c.

When the input pen 2 is inserted deeper, the input pen 2 gets fixed in the pen holder 5 as the top of the stopper 6a fits to the locking groove 2e and the input pen 2 gives an operator a click feeling that the input pen 2 has gets fixed. The back end of the barrel part 2d still appears from the pen holder 5. Thus, the input pen 2 has finished being contained the pen holder 5.

As the top surface 2a is in contact with the flange 5a, the input pen 2 cannot move furthermore even if the operator is about to insert the input pen 2 deeper.

When an operator wants to take out the input pen it is required to hold the appearing bottom end of the barrel part 2d by hand and to supply force in the discharge direction. Once that done, the stopper 6a decouples with the locking groove 2e because the sectional shape of the the locking groove 2e is half circle and the locking groove 2e is shaped like a tapering with its areas of the part along to the axis of the input pen 2 growing large in proportion to going from inner side of the locking groove 2e to outer side. Then, the input pen 2 moves in the discharge direction. Thus, the input pen 2 is taken out.

With the structure of the first embodiment, the input pen 2 can be contained and then out without a releasing button conventionally needed. Furthermore, a complicated part to lock a pen conventionally used is no necessary to contain and take out the input pen 2. Therefore, the mechanism for containing the input pen 2 can be made simpler than conventional one.

In this way, the size of the mechanism for containing the input pen 2 can be made smaller and manufacturing cost can be reduced because the number of parts and the number of manufacturing procedures in assembly decrease. Furthermore, effectivity of operation grows better since it is not necessary to operate such a releasing button as the conventional mechanism has or to push the pen at first when removing an input pen though it is necessary in case a conventional mechanism using complicated parts to lock a pen is operated.

The input pen 2 is so fixed that it is caught between the stopper 6a and flange 5a, so rocking of the input pen 2 in the pen holder 5 gets smaller in this embodiment than that in a case only the stopper 6a would fix the input pen 2.

Therefore, even when some vibration is added to the main body 4 when, for example, the main body 4 is carried around with the input pen 2 in, the mechanism in this embodiment prevents knocking noises which would occur when the input pen 2 knocked the main body 4 by rocking in it. Damage of the main body 4 and the input pen 2 because of rocking can also be avoided.

In the first embodiment, the shape of the cross section of the input pen 2 is an ellipse, but it is only necessary that an operator can hold the input pen 2 by hand and that the input pen 2 is shaped like a stick. Therefore, for example, the shape of the cross section may be a circle or a polygon.

In the first embodiment, the top of the stopper 6a and the locking groove 2e fit to each other, but it is only necessary about both shapes that they can stop each other's movement by coming into contact with each other. They can also carry the pen stopper 6 in the direction against the force of the plate spring 7 when the contained input pen 2 is supplied force in the discharge direction.

Second Embodiment

The following description explains with another example of the present invention with reference to FIGS. 6 to 9. The same reference numerals are given to the members which have the same functions as those of the members of the first embodiment, and the explanation thereof is omitted.

Figure 6:
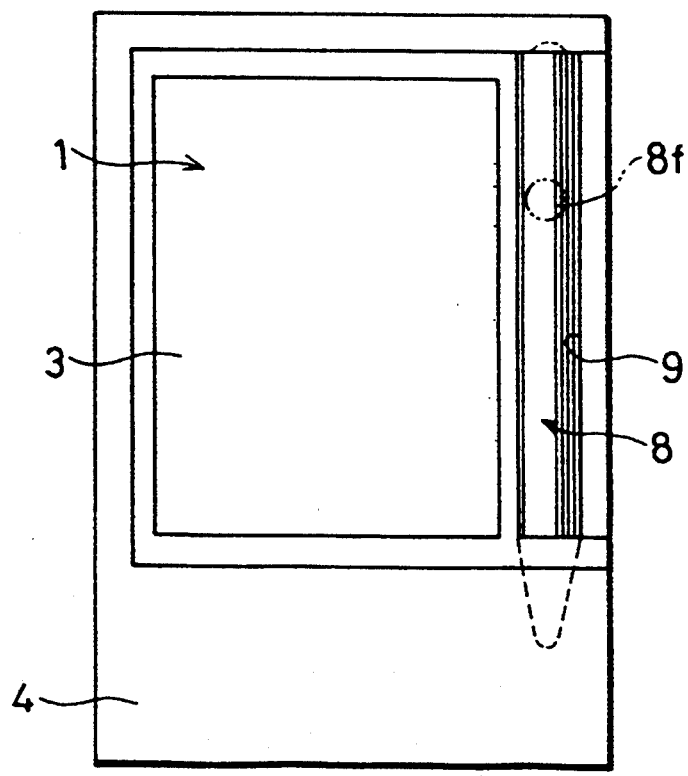
Fig. 6 shows a plane view of a mechanism for containing an input pen of the second embodiment of the present invention.
Figure 7:
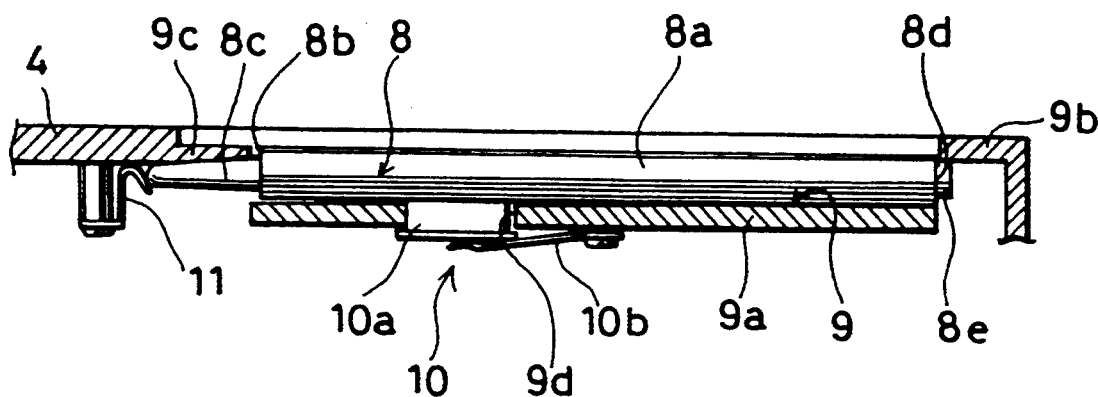
FIG. 7 shows a cross sectional view of the above described mechanism for containing an input pen when it contains the input pen.

In this mechanism for containing an input pen, a handwriting-use input screen 1 is on an upper surface of a main body 4 as shown in FIG. 6. There is provided a pen container 9 (containing means) along the handwriting-use input screen 1, which extends lengthwise of the main body 4. The pen container 9 is to contain a touch pen 8 (an input pen) shaped substantially like a stick as a pen for inputting data. The touch pen 8 has drawing and inputting functions comparable with those the input pen 2 has by drawing on the tablet 3 in the first embodiment.

The touch pen 8 has a touch pen barrel 8a shaped substantially like a column, a top end 8b at the top end of the touch pen barrel 8a, and a pen point 8c on the top end 8b. The pen point 8c is shaped substantially like a conic trapezoid standing along the axis of the touch pen 8. Therefore, the pen point 8c is shaped like a tapering. The closer it is from bottom to top, the narrower it is. The top of the pen point 8c are rounded and the maximum diameter of the side touching the top end 8b is smaller than the diameter of the top end 8b.

There is provided a back end 8d on the bottom side of the touch pen 8, and there is provided a coupling nail (a projection part) shaped substantially like a column standing coaxially with the touch pen 8 on the back end 8d. The coupling nail 8e is set to a predetermined length, for example, 0.5 mm from the end of the coupling nail 18e to the back end 8d.

There is provided a container bottom 9a (a depression part) shaped substantially like a plate and substantially parallel to the upper surface of the main body 4. The container bottom 9a is in touch with the touch pen barrel 8a of the contained touch pen 8. back end stopper 9b is lengthened from the upper surface of the main body 4. The back end stopper 9b is in contact with the back end 8d and the perimeter of the coupling nail 8e. There is provided a top end stopper 9c shaped substantially like a plate, which is in touch with the pen point 8c on the slanting frame line of the pen point 8c.

The below side of the top end stopper 9c is so slanting for the upper surface of the main body 4 that it may growth inner as it is nearer to the top. The distance between the back end stopper 9b and the top end stopper 9c is the same as a length of the touch pen barrel plus the coupling nail 8e in the direction of the axis of the touch pen 8. Or the distance is a little longer than the sum.

There is provided a pop-up part 10 (force supplying means) at the site of one third of the distance from top end to bottom side of the container bottom 9a. The pop-up part 10 supplies force in such direction as the inserted touch pen 8 discharges from the pen container 9. The pop-up part 10 has a contact part 10a and a launching spring 10b. The contact part 10a is shaped substantially like a rectangular parallelopiped and pushes the touch pen barrel 8a. The launching spring 10b is shaped substantially like a plate and supplies force towards the upper surface of the main body 4.

Therefore, there is provided a rectangular opening 9d in the container bottom 9a, which the contact part 10a can pass through. One coupling end of the launching spring 10b is fixed on the container bottom 9a.

There is provided a pushing spring 11 (a force supplying part) close to the top end stopper 9c in the main body 4, which pushes the pen point 8c of the touch pen 8 contained in the pen container 9 towards the coupling nail 8e.

The following is an explanation of each movement in the second embodiment. When an operator wants to contain the touch pen 8 in the pen container 9, it is required to hold the touch pen barrel 8a by hand, insert it below the top end stopper 9c, and make the top end 8b of the touch pen 8 be in contact with the top of the top end stopper 9c.

Such a bottom region of the touch pen barrel 8a as a region 8f FIG. 6 is pushed in the direction of the container bottom 9a. Since the distance between the back end stopper 9b and the top end stopper 9c is the same as the length of the touch pen barrel 8a plus the length of the coupling nail 8e or just a little more as already described, the touch pen barrel 8a and the pen container bottom 9a can contact each other against force by the launching spring 10b without the bottom side stopper 9b coupling with the coupling nail 8e.

Then the touch pen 8 is glided by hand towards the bottom side stopper 9b by using force of the pushing spring 11. The coupling nail 8e is coupled with the bottom side stopper 9b, and the touch pen 8 gets contained in the pen container 9.

As the pushing spring 11 has been pushing the touch pen 8 towards the bottom side stopper 9b, the coupling nail 8e has been coupled with the bottom side stopper 9b even when the main body 4 is shaked while carried or so. Therefore, the touch pen 8 is prevented from unexpected releasing from the pen container 9 by the pop-up part 10.

Figure 8:
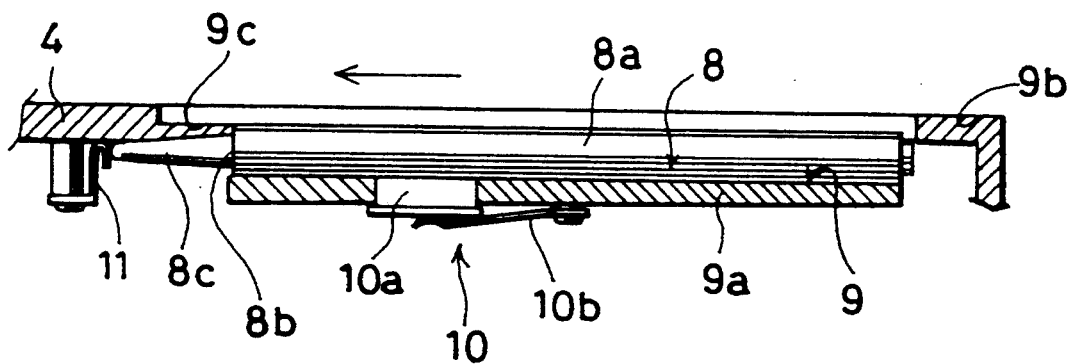
FIG. 8 shows a cross sectional view of the above described mechanism for containing an input pen when the input pen begins getting removed.
Figure 9:
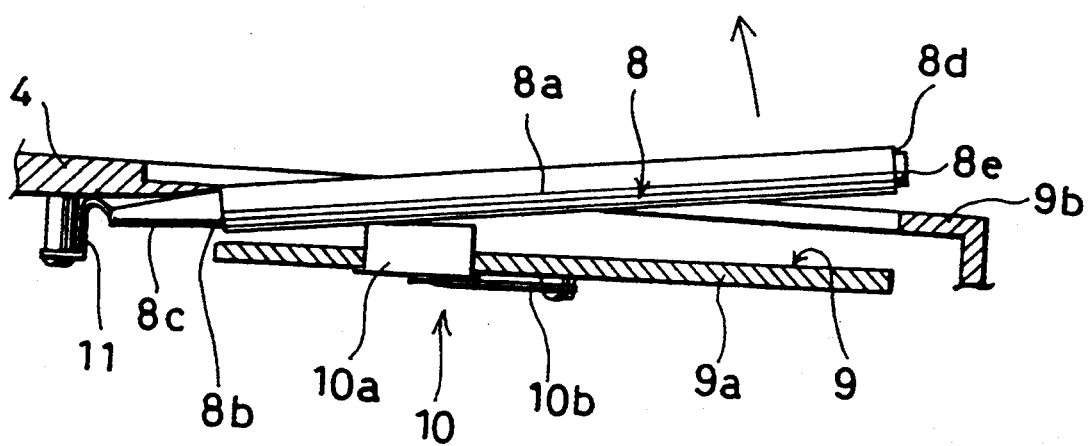
FIG. 9 shows a cross sectional view of the above described mechanism for containing an input pen when the input pen comes out to the position to be taken out.
Figure 10:
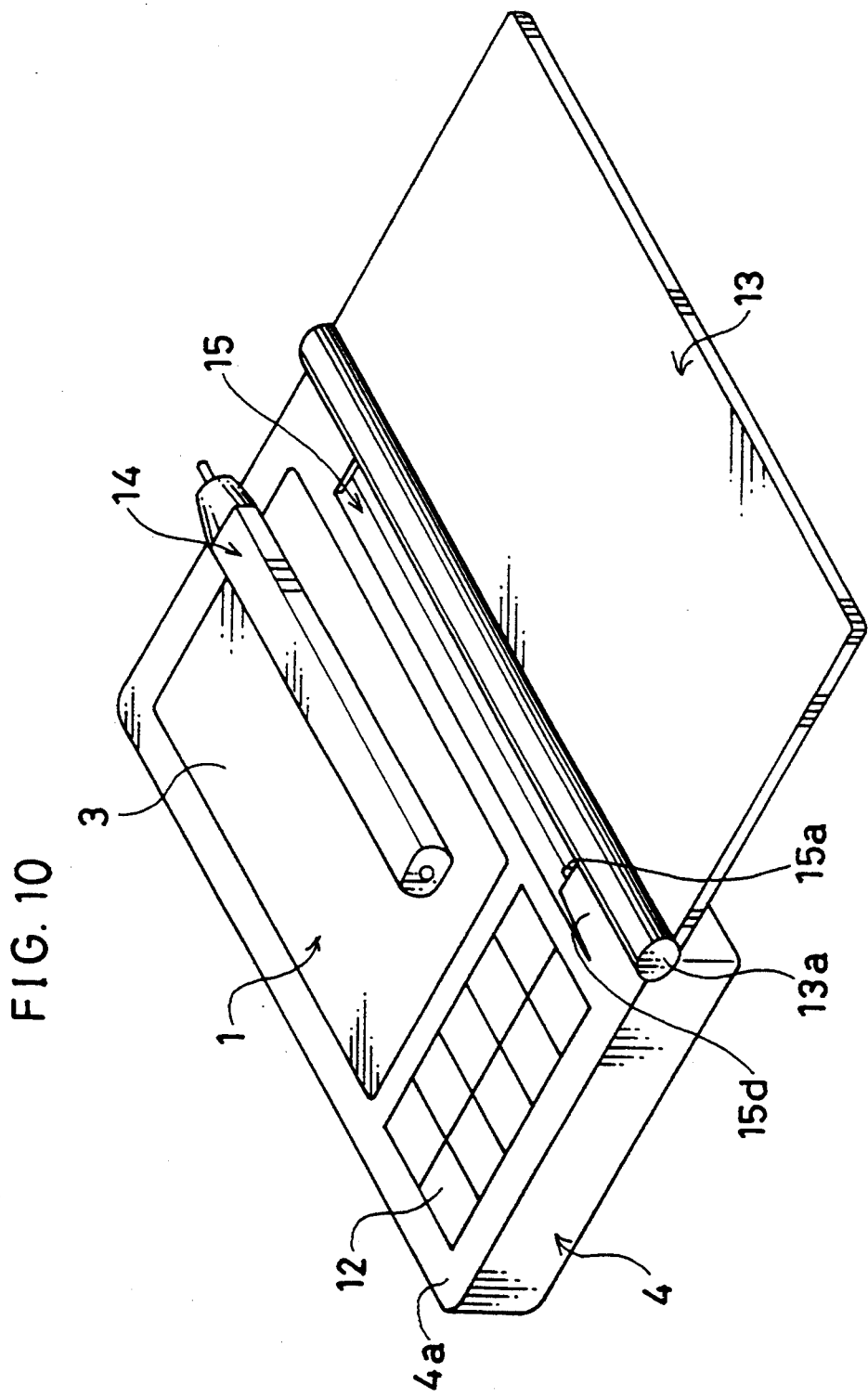
FIG. 10 shows a perspective view of the mechanism for containing an input pen of the third embodiment of the present invention.

When an operator wants to take out the touch pen 8 from the pen container 9, as shown in FIG. 8, the touch pen 8 is glided by hand towards the top end stopper 9c. Then the coupling nail 8e is released from the bottom side stopper 9b, and as shown in FIG. 9, the touch pen 8 turns towards counterclockwise around a contacting point between the top end stopper 9c and the top end 8b by the pop-up part 10. Thus, a bottom region of the touch pen 8 appears, and the touch pen 8 comes up to such position as to take out easily.

With the arrangement of the second embodiment, the touch pen 8 can be contained and taken out without a releasing button conventionally needed. Furthermore, a complicated part to lock a pen conventionally used is no necessary to contain and take out the touch pen 8.

Therefore, the mechanism for containing the touch pen 8 as an input pen can be made simpler than conventional one by this structure. Since the number of parts and the number of procedures in assembly decreases, the size of the mechanism can be made smaller or manufacturing cost can be reduced.

Furthermore, effectivity of operation grows better as an operator who wants to take out the pen can get free from such operation as to push the pen first and pull the pen second necessary to operate conventional mechanisms using parts to lock a pen.

The touch pen 8 is fixed in the pen container 9 by force of the pushing spring 11 and the pop-up part 10, so even when some vibration is added to the main body 4 when, for example, the main body 4 carried around with the input pen 2, the touch pen 8 can be prevented from rocking in the main body 4. Therefore, such noises as knocking one by rocking of a pen, which were easy to ocurr, can be avoided. Damage of the main body 4 and the touch pen 8 because of rocking can also be avoided.

In this second embodiment, the shape of the contact part 10a at the pop-up part 10 is substantially a rectangular parallelopiped, but the shape needs not be such. For example, it may be substantially a column.

Furthermore, the shape of upper surface of the contact part 10a may be a recess shape which fits to or holds the touch pen barrel 8a, and in this case, stability of the position of the touch pen 8 can become better when the touch pen 8 rises from the main body 4.

Third Embodiment

The following description explains third embodiment of the present invention with reference to FIGS. 10 to 14. The same reference numerals are given to the members which have the same functions as those of the members of the first embodiment, and the explanation thereof is omitted.

In this mechanism to contain a writing pen, there is provided a handwriting-use input screen 1 shaped substantially like a rectangle on an upper surface of a main body 4. There is provided a key input part 12 on the main body 4 next to the handwriting-use input screen 1. On the main body 4 there is provided a hard cover 13 which rotates, and which covers and protects the handwriting-use input screen 1 and the key input part 12 when the mechanism is not used.

Figure 11:
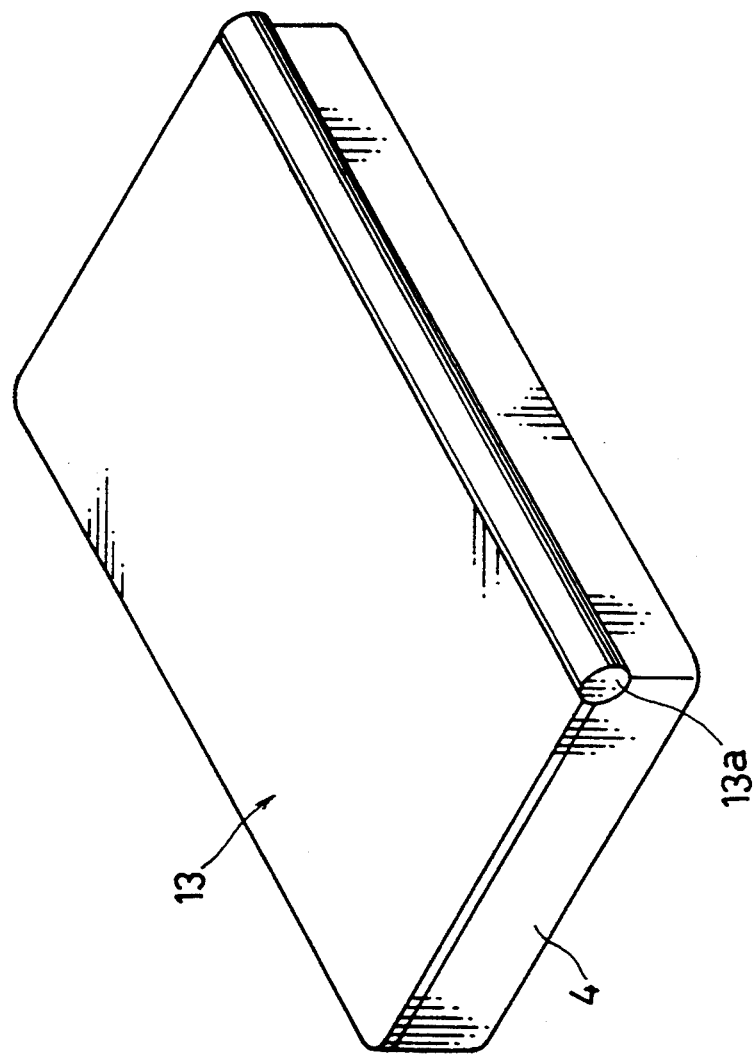
FIG. 11 shows a perspective view of a case where the cover of the above described mechanism for containing an input pen is shut.

There is provided a rotating axis 13a on one side of the upper surface of the main body 4 in the length of the main body 4. The hard cover 13 can cover entirely the handwriting-use input screen 1 and the key input part 12 when the hard cover 13 rotates counterclockwise as shown in FIG. 11.

There is provided a pen contain part 15 (containing means) between the rotating axis 13a above the main body 4 and both the handwriting screen 1 and the key input part 12, which is to contain an input pen 14 shaped substantially like a stick. The input pen 14 has functions comparable with ones the input pen 2 has by drawing on the tablet 3 of the first embodiment.

Figure 12:
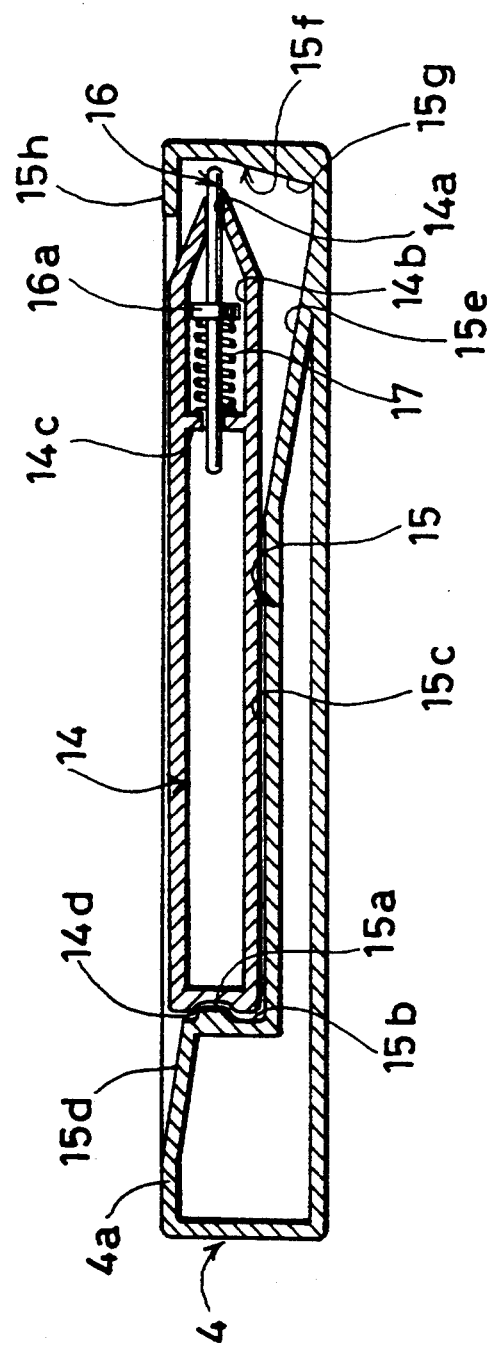
FIG. 12 shows a cross sectional view of the above described mechanism for containing an input pen.

There is provided a part shaped like a tapering which becomes thinner as it is nearer to the top at the top of the input pen 14. There is provided a pen top 16 (a stick member) at the top of the input pen 14 in order to detect the coordinates data on the tablet 3 as shown in FIG. 12. The pen top 16 can move in its axial directions. There is provided a pen top hole 14a at the top of the input pen 14 coaxially.

There is provided a hollow 14b, in which the pen top 16 moves freely, in the input pen 14, which is shaped like a tapering and is thin towards the top end in the top area of the input pen 14. There is provided a pen sustain part 14c shaped like a flange in the hollow 14b, the pen sustain part 14c and the pen top hole 14a supporting the pen top 16 on the axis of the input pen 14.

There is provided a coil spring 17 (force supplying means) on the axis of the input pen 14 on the pen top 16 in the hollow 14b, and there is provided a spring push part 16a shaped substantially like a flange on the pen top 16, which can move in the hollow 14b. The coil spring 17 is put between the spring push part 16a and the pen sustain part 14c. Therefore, the pen top 16 receives the force from the coil spring 17 so as to direct outward with respect to the axial direction.

There is provided a lock depression 14d (a second coupling member) substantially on the axis of the input pen 14 at the back end of the input pen 14, which fits to a lock projection 15a described later (a first coupling member) shaped substantially like a conic trapezoid on the pen contain part 15.

There is provided a back wall 15b on the pen contain part 15, which faces a back end surface of the input pen 14 when it is contained in the pen contain part 15. The lock projection 15a is on the back wall 15b. There is provided a contain bottom 15c on the pen contain part 15, which touches areas from center to bottom of the input pen 14 when it is contained in the pen contain part 15. The contain bottom 15c is so deep from the upper surface 4d that the contained input pen 14 is below the plane consisting of upper surface of the main body 4.

There is provided a removing slope 15d between the above end of the back wall 15b and an upper surface 4d of the main body 4, which becomes deeper as it is nearer from the upper surface 4d to the back wall 15b. The removing slope 15d makes it easy to take out the input pen 14 by exposing an upper part of the back end of the input pen 14.

There is provided an assistings slope 15e at the top of the pen contain part 15, which makes it easy to put in and take out the input pen 14. The assisting slope 15e begins at a position of about one third distance from top of the input pen 14. The assisting slope 15e becomes deeper as it is nearer from the begining position to the top of the input pen 14 with a predetermined angle.

The angle of the assisting slope 15e is so set that the bottom of the input pen 14 comes above the back wall 15b when the top part of the input pen 14 gets so pushed below as to touch the assisting slope 15e.

There is provided a top stand 15f at the top of the pen contain part 15, which touches the pen top 16 when the input pen 14 is contained. The top stand 15f is so provided far from the back wall 15b as to push the pen top 16 towards the bottom of the input pen 14 against force of the coil spring 17.

There is provided a pressure keeping slope 15g between the top stand 15f and the assisting slope 15e, which keeps the condition that the pen top 16 is pushed while the pen top 16 moves below as the top of the input pen 14 is pushed in.

There is provided a cover plate 15h which extends from the top end of the top stand 15f in the substantially same plane, which covers the pen top 16 when the input pen 14 is contained.

Figure 13:
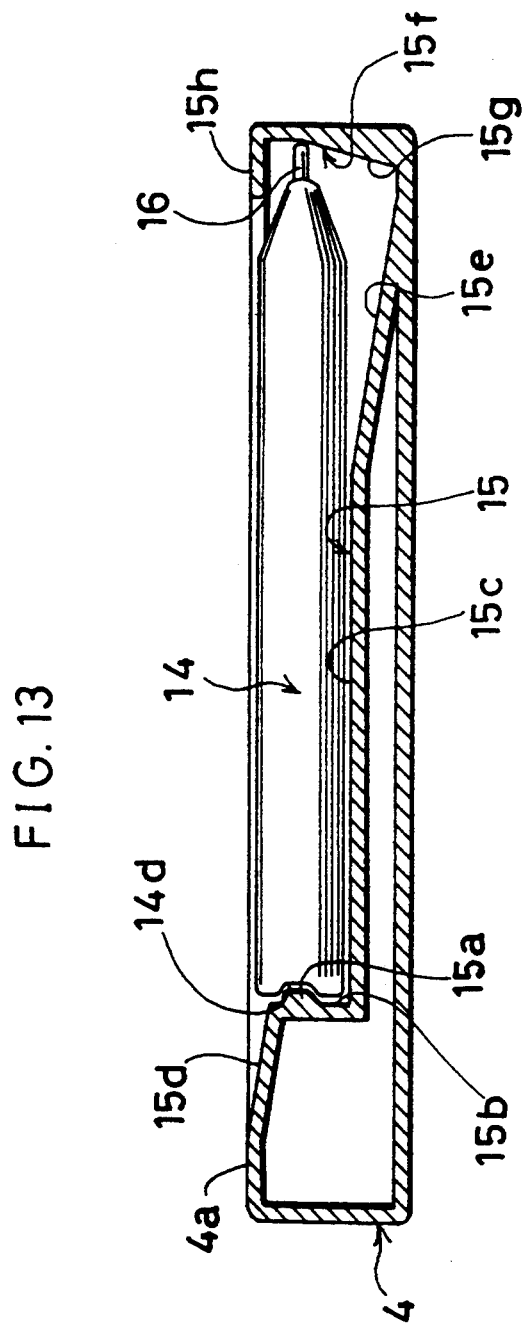
FIG. 13 shows a cross sectional view of the above described mechanism for containing an input pen.

The following is an explanation of each movement in the third embodiment. As shown in FIG. 13, when an operator wants to take out the input pen 14, it is required to push the top part of the input pen 14 to the assisting slope 15e. Therefore, moment around the input pen 14 occurs clockwise at the fulcrum of the border line between the contain bottom 15c and the assisting slope 15e.

Then, force in the axial direction to the top stand 15f is generated by the moment which pushes the input pen 14 towards the top stand 15f because the lock projection 15a is shaped like a tapering and thinner gradually towards the top.

Therefore, the force to the axial direction by the moment grows bigger than the force by the coil spring 17 till the input pen 14 begins sliding towards the tops stand 15f. Therefore, the input pen 14 rotates clockwise at the already described fulcrum with sliding towards the top stand 15f.

When the input pen 14 is pushed deeper, the top of the input pen 14 touches the assisting slope 15e and the lock depression 14d decouples with the lock projection 15a. Then the bottom of the input pen 14 comes above and decouples with the back wall 15b.

Figure 14:
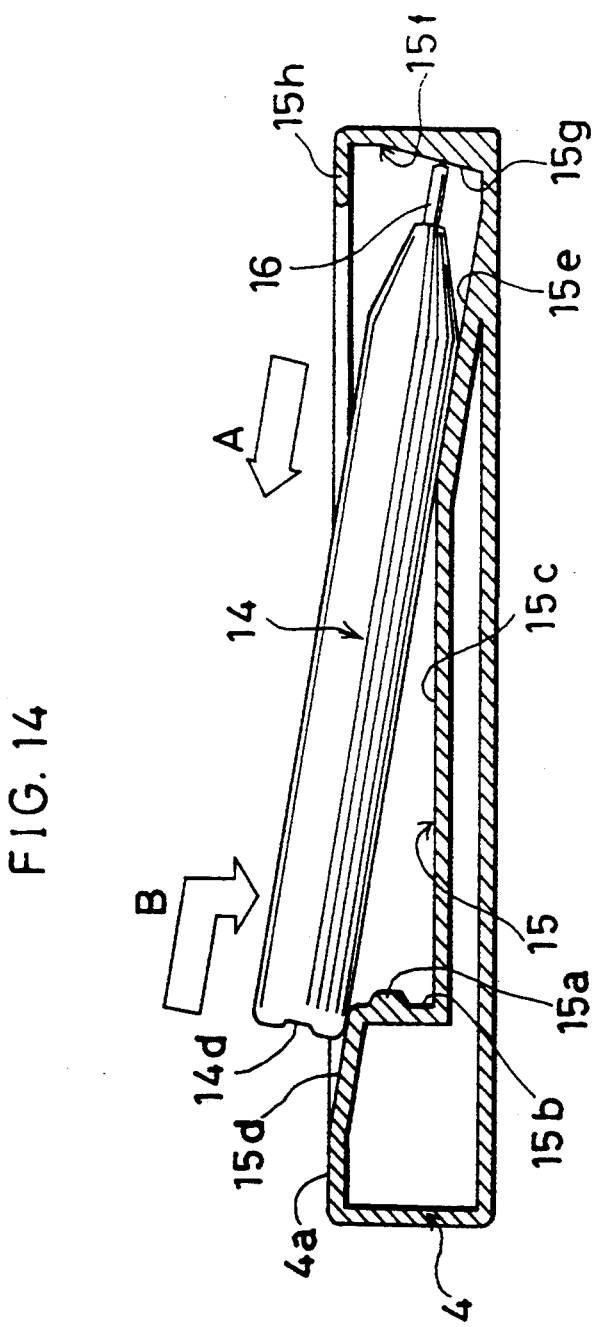
FIG. 14 shows a cross sectional view of the above described mechanism for containing an input pen when the input pen is put in and taken out.
Figure 15:
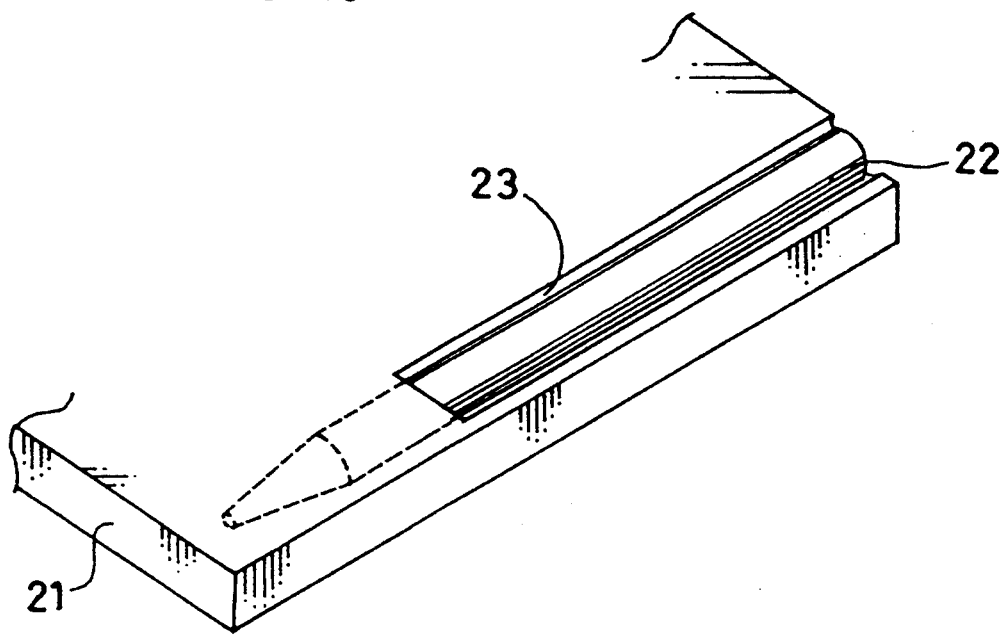
FIG. 15 shows a perspective view of a conventional mechanism for containing an input
Figure 16:
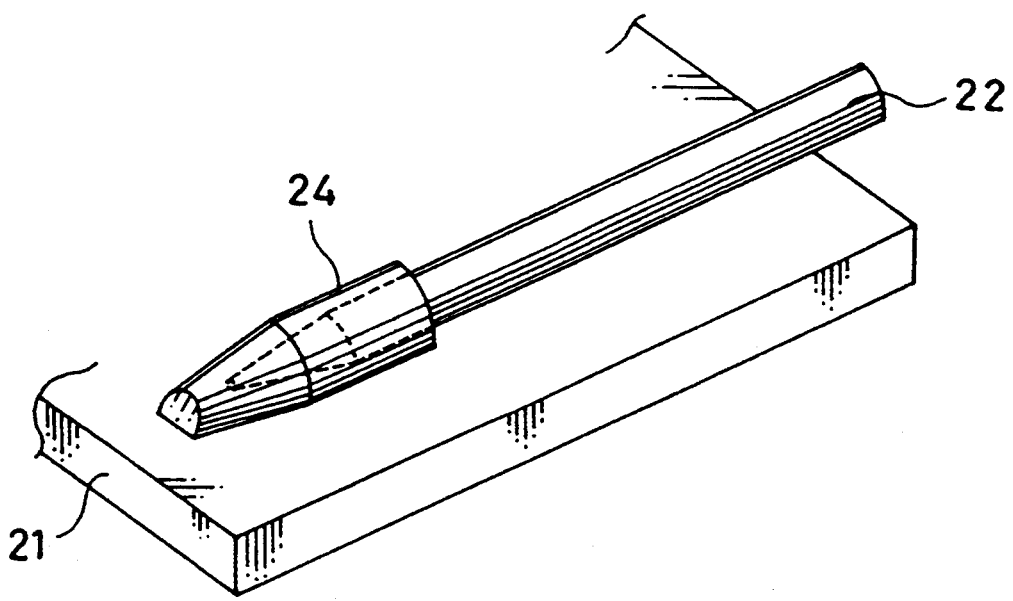
FIG. 16 shows a perspective view of another conventional mechanism for containing an input pen.
Figure 17:
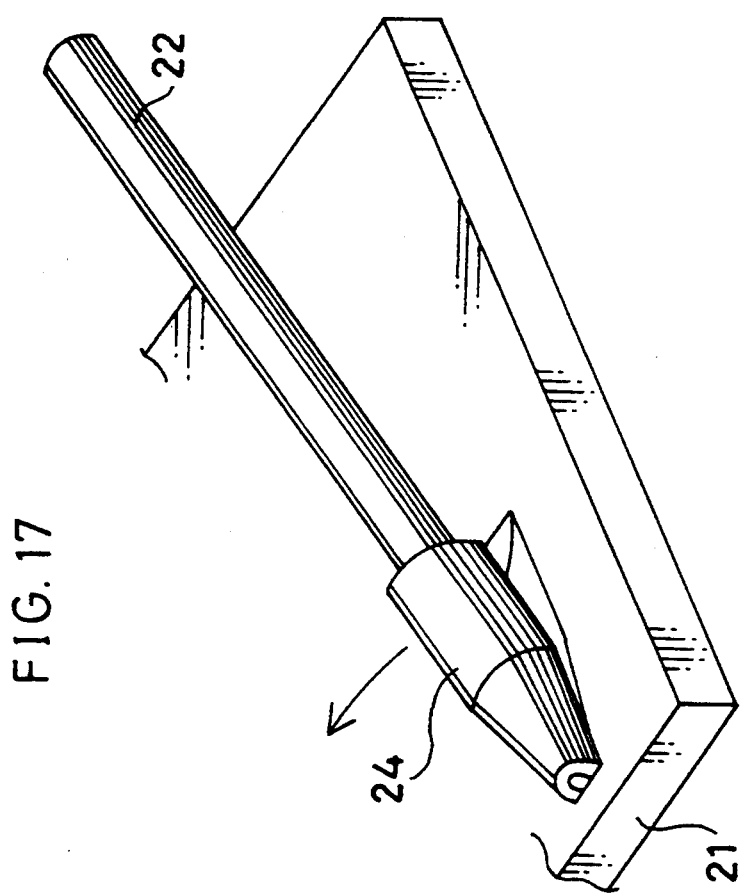
FIG. 17 shows a perspective view of a case where an input pen is taken out.
Figure 18:
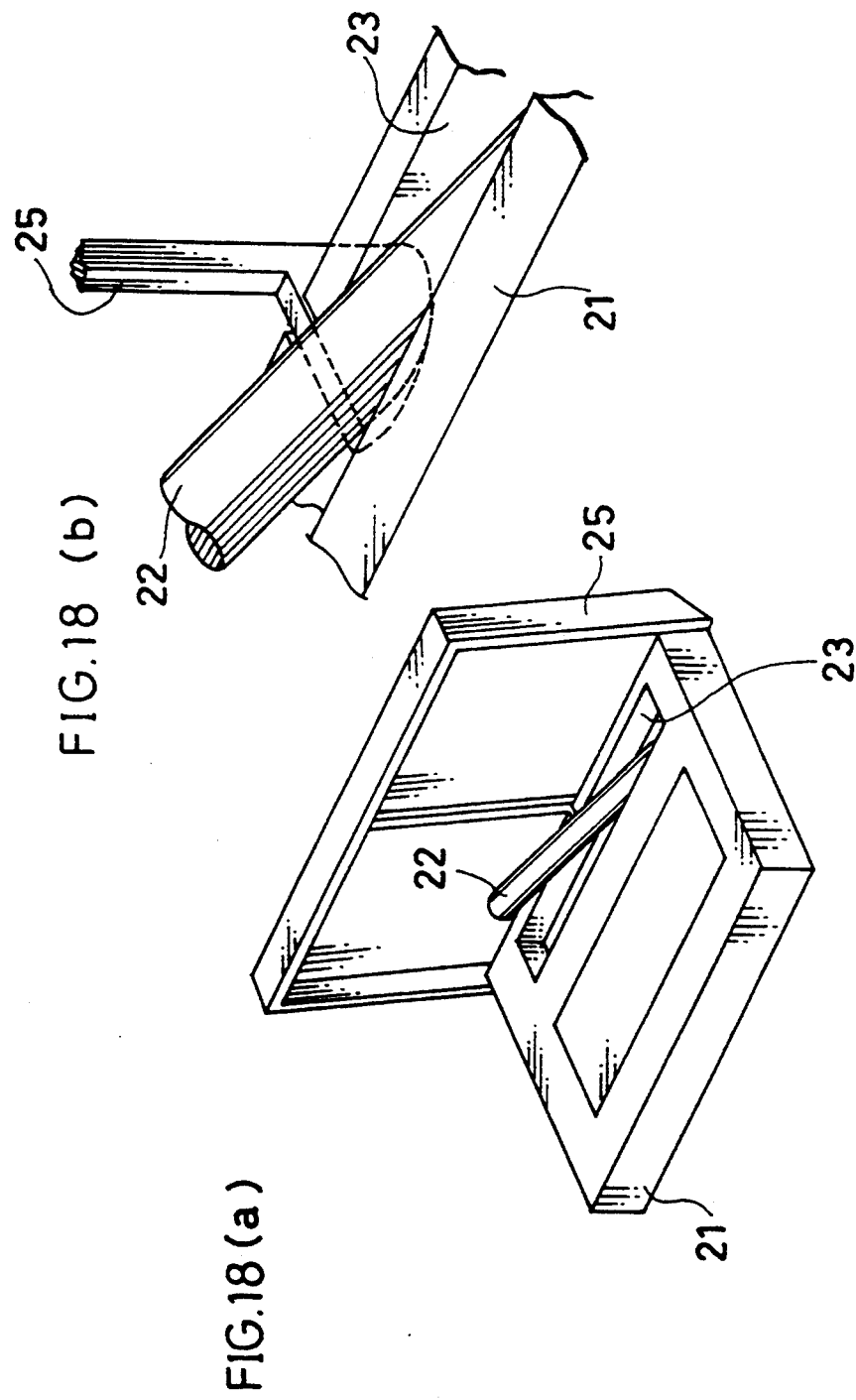
FIG. 18(a) and FIG. 18(b) show a views of still another conventional mechanism for containing an input pen.
Figure 19:
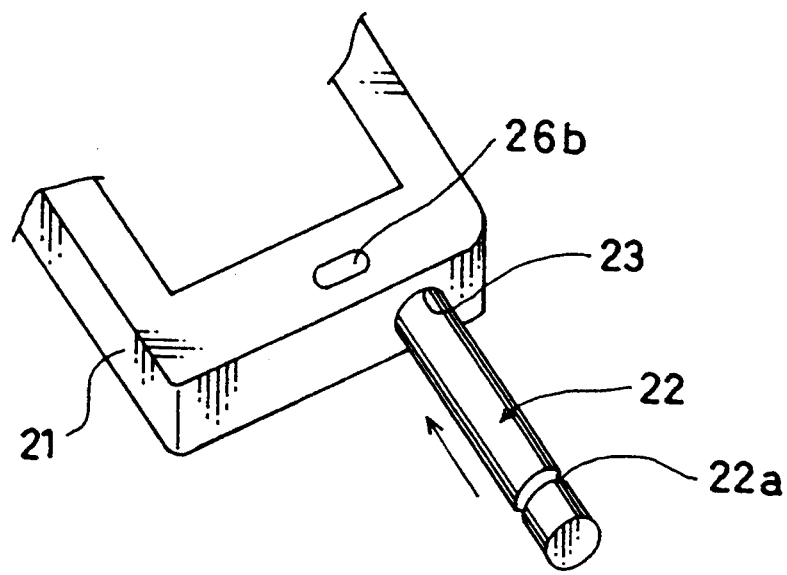
FIG. 19 shows a perspective view of another conventional mechanism for containing an input pen.
Figure 20:
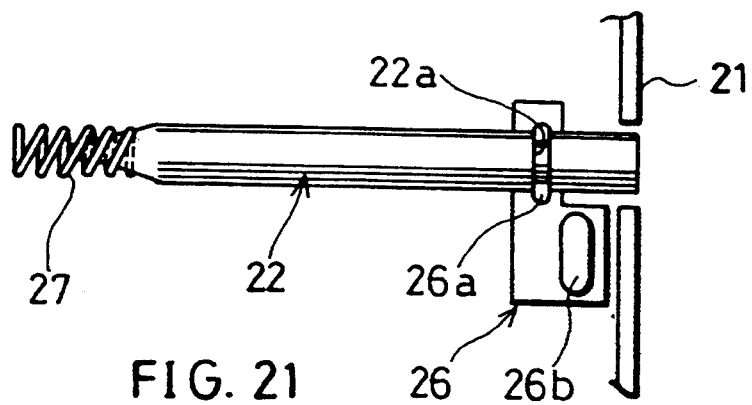
FIG. 20 shows a structural plan view of a main portion of the above described mechanism for containing an input pen.
Figure 21:
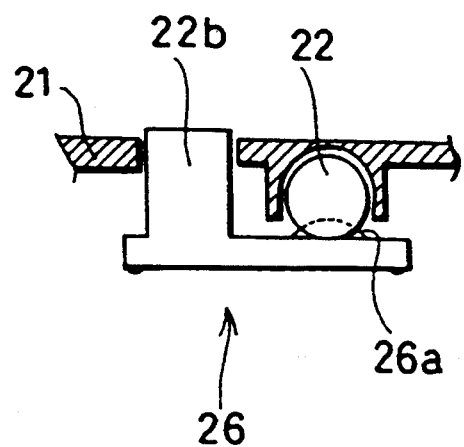
FIG. 21 shows a cross sectional view of a main portion of the above described mechanism for containing an input pen.

The pen top 16 pushes the pressure keeping slope 15g in accordance with the force of the coil spring 17, so the input pen 14 moves towards the back wall 15b, that is, in the direction of an arrow A in FIG. 14, until the bottom of the input pen 14 gets on the removing slope 15d.

The pressure keeping slope 15g is so slanting that the pen top 16 can keep retreating against the force of the coil spring 17 even when the pen top 16 moves below along with the pressure keeping slope 15g. So the input pen 14 can move fast in the direction of the arrow A. As the input pen 14 comes out as above described, it can be taken out easily by hand. Thus the procedure of taking out is finished.

When an operator wants to contain the input pen 14 into the pen contain part 15, it is required to insert the top of the input pen 14 below the cover plate 15h and, as shown by an arrow B, to place the pen top 16 on the pressure keeping slope 15g, and to push the pen top 16 towards the top stand 15f so as to make the pen top 16 retreat in the input pen 14, that is, goes backwards.

Subsequently the bottom of the input pen 14 is pushed towards the contain bottom 15c. Therefore, the pen top 16 is pushed in while the bottom of the input pen 14 touches the lock projection 15a, and thereafter the lock projection 15a couples with the lock depression 14d.

Thus, the input pen 14 is contained in the pen contain part 15 with the coil spring 17 shrinked along with the axis of the input pen 14. Therefore, the pen top 16 pushes the top stand 15f by the force of the coil spring 17. And the lock projection 15a and the lock depression 14d fits to each other as above described. Therefore, the input pen 14 is fixed in the pen contain part 15.

In the structure of the third embodiment, the input pen 14 can be contained and taken out without a releasing button conventionally needed.

Furthermore, a complicated part to lock a pen conventionally used is no necessary in order that the input pen 14 is contained and taken out.

Therefore, the mechanism for containing the input pen 14 can be made simpler than the conventional one. Since the number of parts and the number of procedures in assembly ones decrease, the size of the mechanism can be made smaller or cost in assembly can be reduced.

Furthermore, effectivity of operation grows better as an operator who wants to take out the pen can get free from the such operation as to push the pen at first and pull the pen second necessary to the conventional mechanism using parts to lock a pen.

The input pen 14 is contained in the pen contain part 15 since the pen top 16 pushes the top stand 15f by the force of the coil spring 17 and the lock projection 15a fits the lock depression 14d. Therefore, even when some vibration is added to the main body 4 when, for example, the main body 4 is carried around with the input pen 14 in, the input pen 14 can be prevented from rocking in the main body 4. Therefore, noises such as one by knocking do not ocurr. Injury of the main body 4 and the input pen 14 because of rocking can also be avoided.

In the third embodiment, the shape of the lock projection 15a is substantially trapezoid and the lock depression 14d is shaped as it can fit to the lock projection 15a, but they do not need to be shaped as they fit each other as above described. All necessary about their shapes is that they can touch and fix in to each other when the input pen 14 is contained and that at least one of them can add force as to act against force of the coil spring 17 when force to discharge direction is added to the input pen 14.

What is claimed is:

1. A mechanism for containing an input pen comprising:

containing means for containing an input pen having a stick shape, said containing means for coupling with a front end and a back end of said input pen respectively, wherein said containing means includes a depression part adapted to receive said input pen from above the mechanism; and force supplying means provided in said containing means for supplying a force to said input pen contained in said containing means to remove said input pen from said containing means, said force supplying means is provided at a bottom of said depression part to supply an upward force substantially orthogonal to an axis of the containing means and applied against said input pen contained in said containing means;

wherein said containing means is formed so that said input pen is coaxially movable with respect to an axial direction of the containing means and that said containing means can decouple with either the front end or the back end of said input pen contained in said containing means when said input pen moves.

2. The mechanism for containing an input pen according to claim 1, wherein said force supplying means pushes the front end of said input pen contained in said containing means.

3. The mechanism for containing an input pen according to claim 1, wherein the top front end of said input pen is is tapered and is thinner at the front end than at the back end of said input pen, and said pen includes a projection part having an outer periphery coming into contact with said containing means by projecting in an axial direction of said input pen when said input pen is contained in said containing means.

4. The mechanism for containing an input pen according to claim 1, further comprising:

a force supplying part in said containing means for supplying force against said input pen such that said input pen is pushed back coaxially to the axial direction in the containing means when said input pen is in said containing means.

5. A mechanism for containing an input pen comprising:

a stick member at a front end of the input pen having a stick shape, said stick member being movable coaxially to said input pen;

force supplying means, provided in said input pen, for supplying a force to project said stick member from the front end of said input pen; and containing means for containing said input pen by pushing said stick member in the axial direction into said input pen, and by contacting a back end of said input pen, wherein said containing means includes a stand against which the stick member abuts to depress the stick member into said input pen contained in said containing means.

6. The mechanism for containing an input pen according to claim 5, wherein said containing means includes an assisting slope is in a depression and a gap between said assisting slope and said input pen that is greatest near the front end of said input pen, and wherein to rotate said input pen in a discharge direction, the input pen contacts with said assisting slope as said input pen is pushed towards said assisting slope.

7. The mechanism for containing an input pen according to claim 6, wherein said containing means has a first coupling member and said input pen has a second coupling member, said first and second coupling members coupling with each other when said input pen is contained in said containing means, and said contained input pen is pressed in the axial direction when said contained input pen rotates during coupling of said first and second coupling members.

8. The mechanism for containing an input pen according to claim 7, wherein said first coupling member has a projection on said containing means, and said second coupling part has a depression on the back end of said input pen.

9. The mechanism for containing an input pen according to claim 8, wherein said projection part has a shape of a conic trapezoid.

10. The mechanism for containing an input pen according to claim 7, wherein said containing means includes a pressure keeping slope for keeping a pressure condition between said stick member and said containing means while said input pen rotates by force of press.

11. The mechanism for containing an input pen according to claim 6, wherein said containing means includes a removing slope on which the back end of said input pen engages when said input pen rotates by pressing and against said assisting slope by said force supplying means.

12. The mechanism for containing an input pen according to claim 11, wherein said removing slope is provided on a line extending from said assisting slope.

13. A mechanism for containing an input pen on a main body of an electronic device having a display comprising:
a containing part shaped like a pipe, for containing an input pen such that a back end of said input pen remains exposed such that said input pen can be removed from the containing means by grasping the exposed back end;
a first coupling part projecting into said containing part, having a shape for coupling with said contained input pen, said first coupling part moving inwards and backwards with respect to said containing part;
force applying means for supplying force to said first coupling part; and
a second coupling part, which is provided in an outer periphery of said input pen and has a depression, for coupling with said first coupling part such that said input pen is contained in said containing part, wherein
the force from said force supplying means is supplied to said first coupling part when a force is supplied to said contained input pen in a discharge direction.

14. The mechanism for containing an input pen according to claim 13, wherein
said input pen includes a tapered section between a front end and the second coupling part of the pen, and the tapered part becomes thinner as it is nears the front end of said input pen, and
said first coupling part slides along said tapering part and then moves against the force of said applying means.

15. The mechanism for containing an input pen according to claim 13, wherein a head part of said first coupling part has a tapering shape, said tapering shape becoming thinner as it is nears the front end of the input pen.

16. The mechanism for containing an input pen according to claim 15, wherein said head part of said first coupling part is a half circle in cross section.

17. The mechanism for containing an input pen according to claim 15, wherein said head part of said first coupling part is a trapezoid in cross section.

18. The mechanism for containing an input pen according to claim 13, wherein said first coupling part is tapered.

19. The mechanism for containing an input pen according to claim 18, wherein said head part of said second coupling part is a half circle in cross section.

20. The mechanism for containing an input pen according to claim 18, wherein said head part of said second coupling part is a trapezoid in cross section.

21. The mechanism for containing an input pen according to claim 13, wherein said first coupling part has a tapering shape, said tapering shape becoming thinner as end, and near to the fornt end, and
said second coupling part is formed so as to fit a head part of said first coupling part.

22. The mechanism for containing an input pen according to claim 21, wherein said head part of said first coupling part is a half circle in cross section.

23. An electronic device comprising a main body having a display for receiving input data from an input pen comprising:
said input pen having a tip adapted to input positional data to the display and a barrel with locking groove;
said main body including a pen container having a receptacle for receiving at least a portion of said pen, wherein said receptacle includes a detent pen stopper adapted to engage the locking groove when said pen is inserted in the container, the receptacle having a wall with a hole adapted to receive the pen stopper which projects through the hole and into the groove of said pen, and the wall having a plate spring with ends attached to the wall and a center spring area biasing the pen stopper into the hole in the wall.

24. An electronic device having an input pen and a main body with a display for receiving input data from the pen comprising:
a pen container recess on a surface of the main body adapted to receive the pen, the recess having an axis parallel to and below the surface of the body wherein the pen is movable within the recess, the recess having a front recess end with a first ledge for engaging a front end of the pen and a back recess end with a second ledge for engaging a back end of the pen wherein the pen can be disengaged and engaged with the first and second ledges by moving the pen coaxially in the recess; and
a pen ejector mounted within an opening in a bottom wall of the recess and reciprocally movable with respect to the opening along a direction substantially orthogonal to the recess axis, and wherein the pen ejector is biased into the recess by a spring attached to the bottom wall.

25. An electronic device having an input pen and a main body with a display for receiving input data from the pen comprising:
a pen container recess on a surface of the main body adapted to receive the pen, the recess having an axis parallel to and below the surface of the body wherein the pen is movable coaxially to the axis of the recess within the recess, the recess having a front recess end with a ledge for engaging a front end of the pen and a back recess end with a back protrusion for engaging a back end of the pen, wherein the distance between the ledge and back protrusion is substantially shorter than an extended axial length of the pen and substantially shorter than an unextended axial length of the pen;

a stick piston projecting from a front end of the input pen and reciprocally movable with respect to the front end and said stick piston being biased longitudinally outward for the front end of the pen by a spring contained within the pen, wherein the extended axial length of the pen is the distance from a back end of the pen and an exposed end of the stick when projected from the front end of the input pen, and the unextended axial length of the pen is the distance between the back end of the pen and the exposed end of the stick when the stick is pushed into the pen.

26. An electronic device as in claim 25 wherein the pen recess further includes a depression forming a gap below the front end of the pen and an angled wall adjacent the stick wherein as the pen is removed from the recess it moves into the depression and the stick is pushed into the pen as the stick slides against the angled wall.

* * * * *